(12) United States Patent (10) Patent No.: US 12,674,527 B2
Tecson et al. (45) Date of Patent: Jul. 7, 2026

---

(54) CAST-IN-PLACE THROUGH-PENETRATION FIRESTOP DEVICE

(71) Applicant: Hilti Aktiengesellschaft, Schaan (LI)

(72) Inventors: Joshua Tecson, Bedford, TX (US);
Chad Stroike, Roanoke, TX (US)

(73) Assignee: Hilti Aktiengesellschaft, Schaan (LI)

( * ) Notice: Subject to any disclaimer, the term of this patent is extended or adjusted under 35 U.S.C. 154(b) by 326 days.

(21) Appl. No.: 18/514,776

(22) Filed: Nov. 20, 2023

(65) Prior Publication Data

US 2025/0164040 A1 May 22, 2025

(51) Int. Cl.
| | |
|---|---|
| *F16L 5/04* | (2006.01) |
| *A62C 2/06* | (2006.01) |
| *E04B 5/48* | (2006.01) |
| *E04G 15/06* | (2006.01) |

(52) U.S. Cl.
CPC ................ *F16L 5/04* (2013.01); *A62C 2/065* (2013.01); *E04B 5/48* (2013.01); *E04G 15/061* (2013.01)

(58) Field of Classification Search
CPC ....... F16L 5/04; F16L 5/02; F16L 1/06; A62C 2/065; A62C 2/06; E04B 5/48; E04B 1/947; E04G 15/061; H02G 3/0412
USPC ......................... 169/48, 54; 52/232; 277/626
See application file for complete search history.

(56) References Cited

U.S. PATENT DOCUMENTS

| | | | |
|---|---|---|---|
| 4,091,231 | A | 5/1978 | Sotolongo |
| 9,909,328 | B2 * | 3/2018 | Kurz ..................... E04G 15/061 |
| 2003/0009961 | A1 * | 1/2003 | Radke .................. E04G 15/061 52/220.8 |
| 2010/0326678 | A1 * | 12/2010 | Monden ............... H02G 3/0412 169/54 |
| 2013/0020460 | A1 * | 1/2013 | Von Rummelhoff ..... B28B 7/30 249/142 |
| 2014/0260015 | A1 * | 9/2014 | McConnell ............. E04B 1/948 277/626 |
| 2015/0121783 | A1 * | 5/2015 | McConnell ............. E04B 1/941 52/232 |
| 2015/0204088 | A1 * | 7/2015 | Brown .................... E04B 1/947 52/577 |
| 2017/0009470 | A1 | 1/2017 | Kurz |
| 2017/0073965 | A1 * | 3/2017 | McConnell ............. E04B 1/948 |
| 2021/0234350 | A1 * | 7/2021 | Simon ...................... F16L 5/04 |

FOREIGN PATENT DOCUMENTS

CA          2 875 433 A1     8/2015

* cited by examiner

*Primary Examiner* — Kevin Edward Schwartz
(74) *Attorney, Agent, or Firm* — Grüneberg Global IP, PLLC

(57) ABSTRACT

A cast-in pass-through firestop device has a hollow tubular body, a bayonet mechanism for adjusting a height, a sealing ring engaged with the bayonet mechanism, and an inlay made of intumescent firestop material arranged within the hollow tubular body.

7 Claims, 5 Drawing Sheets

CAST-IN-PLACE THROUGH-PENETRATION FIRESTOP DEVICE

BACKGROUND OF THE INVENTION

Field of the Invention

The present invention relates generally to firestop devices, and more particularly, to a cast-in pass-through firestop device for passing cables, pipes, and the like through a concrete structure, such as a ceiling, floor, and wall.

SUMMARY OF THE INVENTION

A cast-in pass-through firestop device comprises a hollow tubular body. The tubular body comprises a first tubular body part and a second tubular body part. The first tubular body part overlaps with the second tubular body along a principal axis. A bayonet locking mechanism is provided for adjusting the overlap of the first tubular body part and the second tubular part. The bayonet locking mechanism comprises a key pin which is radially projecting from the first tubular body part. A key passage is radially recessed in the second tubular body part. The key pin is radially engaged with the key passage. The key passage comprises at least two first sections which are arranged in different planes perpendicular to the principal axis. A second section is arranged at least partly in parallel to the principal axis and connects with the first sections. The bayonet locking mechanism can allow for changing the overall height of the cast-in pass-through firestop device by shifting the key pin between the different horizontal passages. A sealing ring is mounted rotatably on the first tubular body part and comprises a radially projecting sealing ridge. The sealing ridge is engaged with the second section of the key passage. The sealing ring can prevent concrete to flow along the vertical passages of the bayonet mechanism. An inlay made of intumescent firestop material arranged within the hollow tubular body.

The first sections can be displaced to each other along the principal axis by first distances, and the key pin is displaced to the sealing by a second distance, wherein the second distance is different to the first differences. The vertical arranged of the sealing ring with respect to the key pin can inhibit the sealing to leave the vertical section by entering into the horizontal section of the bayonet mechanism.

A dimension along the principal axis of the first sections can be smaller than a dimension along the principal axis of the sealing ridge. The horizontal sections are not wide enough to allow the sealing ridge to enter. Hence, the sealing ridge remains in the vertical section of the bayonet mechanism.

A lid can be removably attached to the hollow tubular body. The lid can comprise one or more threads for engaging with the tubular body. Each thread is formed by one or more ribs that are arranged along a helical curve and separated along the helical curve by gap. The intermittently interrupted threads allow for pushing out the lid without unscrewing.

A base plate and a metallic ring can be provided. The metallic ring is arranged between the base plate and the intumescent inlay. The metallic ring can have radially extending fingers which are engaged into corresponding slits in the tubular body. The metallic ring can be made of two halves.

DETAILED DESCRIPTION OF THE INVENTION

Figure 1:
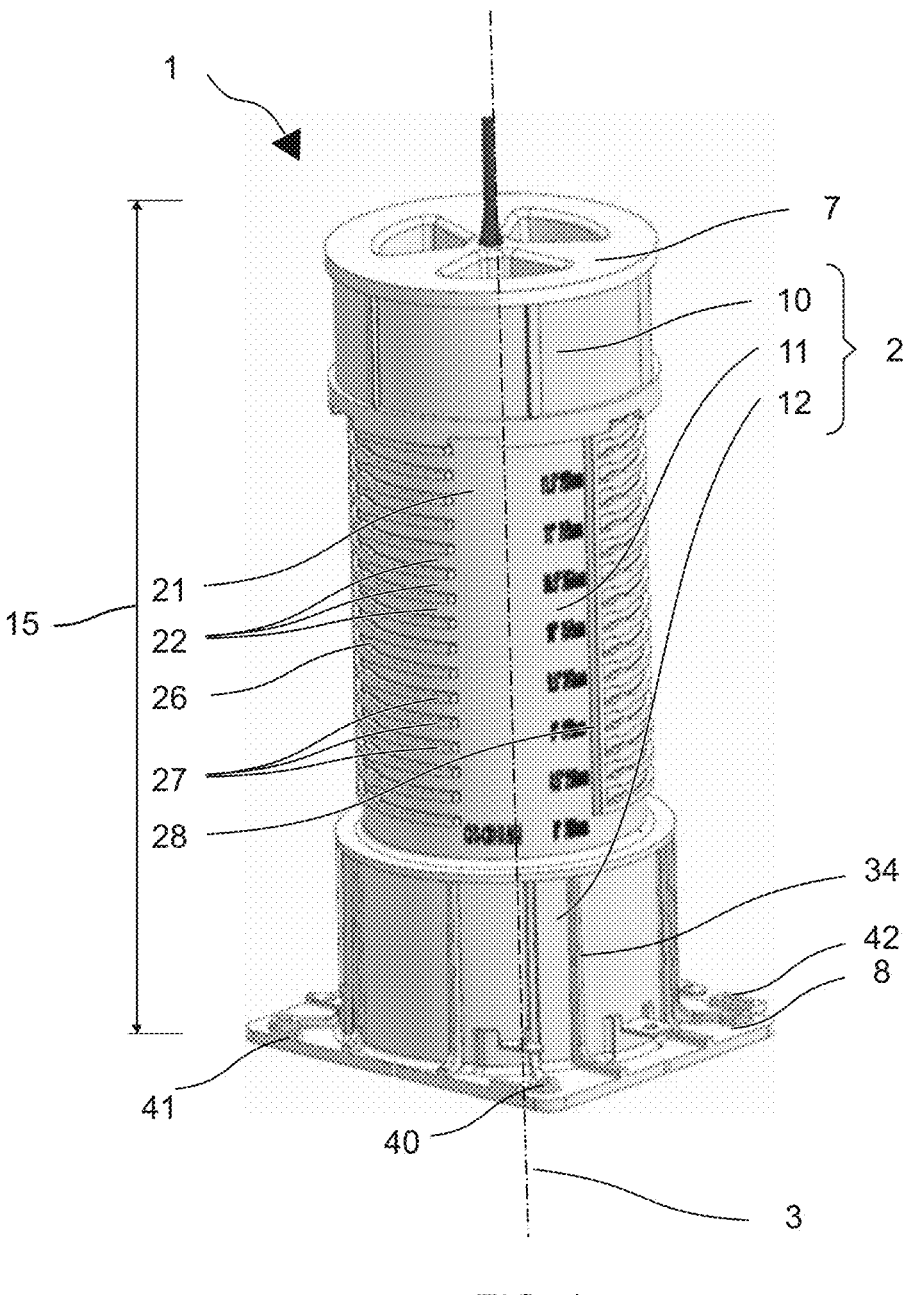
FIG. 1 shows a cast-in pass-through firestop device
Figure 2:
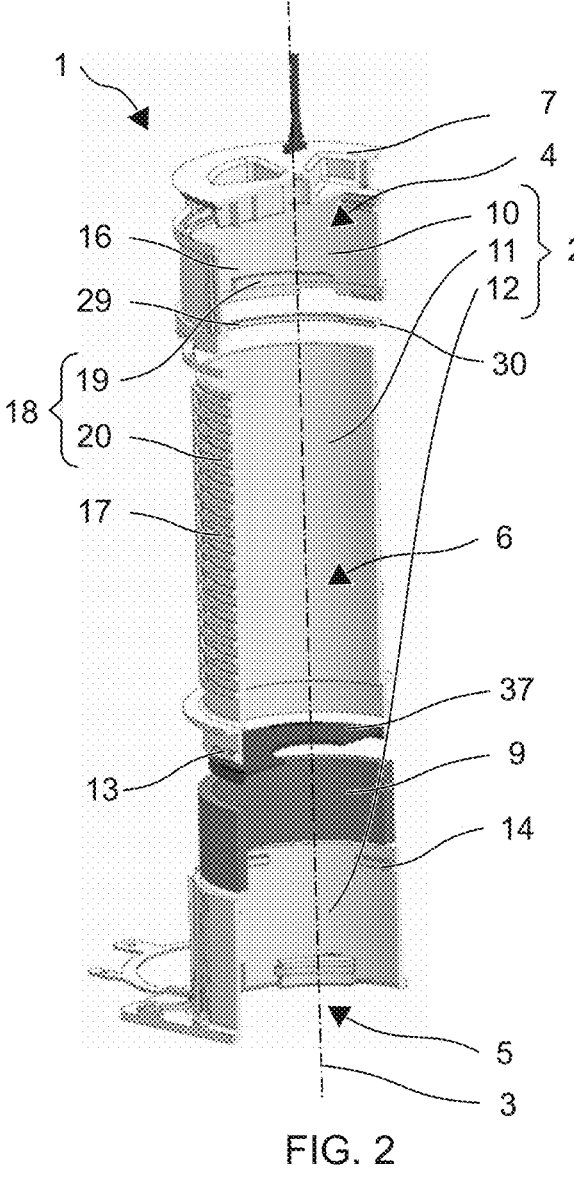
FIG. 2 shows a cut open and disassembled cast-in pass-through firestop device
Figure 3:
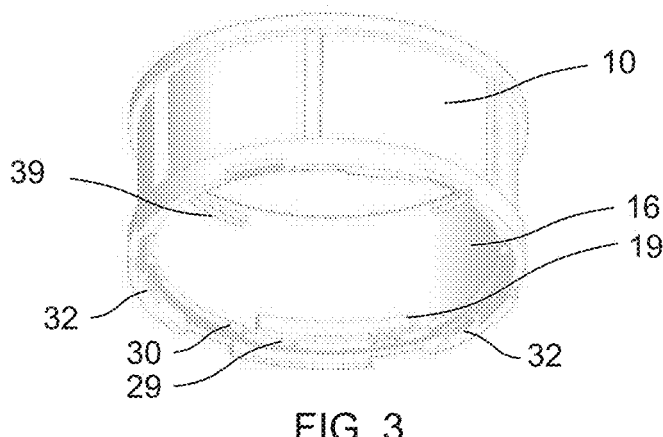
FIG. 3 show a top part of the cast-in pass-through firestop device
Figure 4:
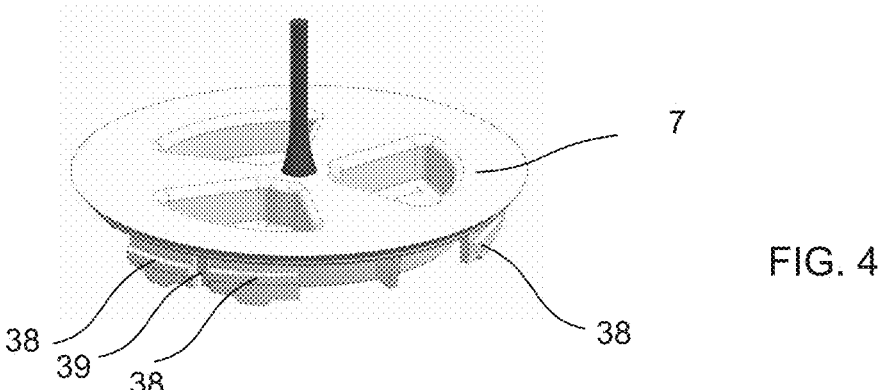
FIG. 4 shows a lid of the cast-in pass-through firestop device
Figure 5:
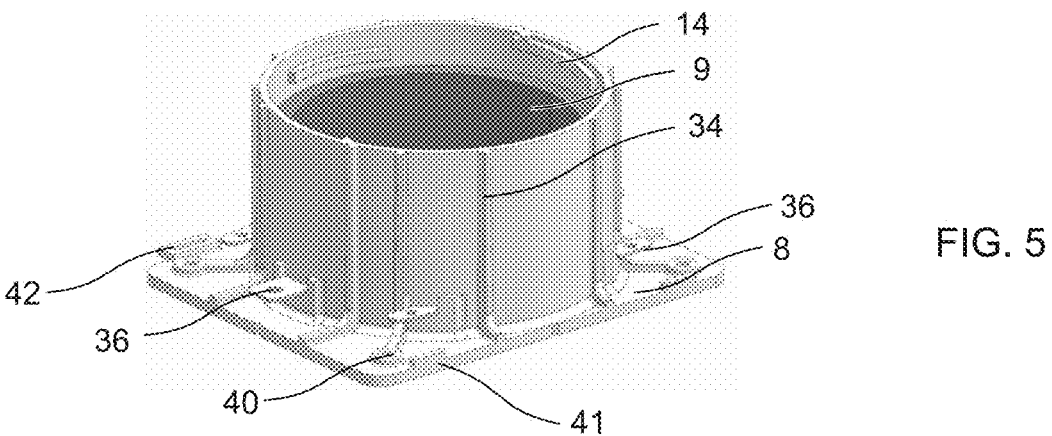
FIG. 5 shows a bottom part of the cast-in pass-through firestop device
Figure 6:
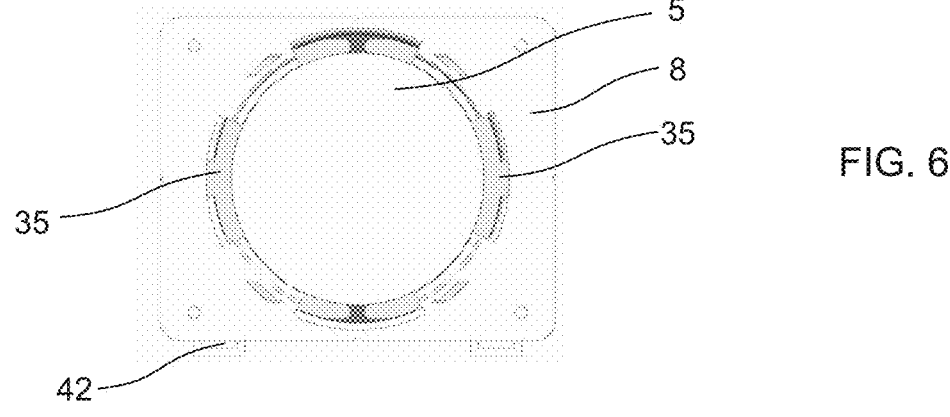
FIG. 6 shows a bottom view on the cast-in pass-through firestop device

An embodiment of a cast-in pass-through firestop device 1 is described with reference to FIG. 1 to FIG. 3. The cast-in pass-through firestop device 1 has a straight, hollow tubular body 2. The tubular body 2 extends along a principal axis 3. The tubular body 2 has two openings 4, 5. The openings 4, 5 are at the ends of the tubular body 2. A channel 6 inside the tubular body 2 connects the two openings 4, 5. A removable lid 7 can be temporarily mounted on the upper opening 4 of the openings 4. A base plate 8 is arranged in the plane of the lower opening 5. The base plate 8 is perpendicular to the principal axis 3 of the tubular body. A ring-shaped intumescent inlay 9 made of intumescent material is arranged within the tubular body 2. The channel 6 extends through the intumescent inlay 9. In case of a fire, the intumescent inlay 9 radially expands and closes the channel 6.

The tubular body 2 is composed of at least two, for instance at least three, tubular body parts 10, 11, 12. The tubular body parts 10, 11, 12 can be made of polypropylene and can be manufactured by injection molding. The tubular body 2 can be assembled and disassembled into the tubular body parts 10, 11, 12 without use of a tool. For instance, the tubular body parts 11, 12 can be screwed together via thread elements 13, 14 formed into the surfaces of the tubular body parts 11, 12. The tubular body parts 10, 11, 12 can all have cylindrically shaped outer surfaces and cylindrically inner surfaces. In other embodiments at least one tubular body part 11 has a cylindrically outer surface and at least one other tubular body part has a cylindrically shaped inner surface. The other tubular body parts 12 can be of a cylindrical shape, prismatic shape, cone-shape, or pyramidal shape. The tubular body parts 10, 11, 12 are arranged subsequently along the principal axis 3. Neighboring body parts 10, 11, 12 can be overlappingly arranged along the principal axis 3. The principal axis 3 can be the symmetry axis of the cylindrically shaped tubular body parts 10, 11.

A height 15 of the tubular body 2, i.e. its dimension along the principal axis 3, can be adjusted by displacing the first tubular body part 10 with respect to the second tubular body part 11 along the principal axis 3. An overlap of the first section 10 and the second section 11 can be increased for decreasing the height 15 and the overlap can be decreased for a increasing the height 15, respectively. The inner surface 16 of the first tubular part 10 and the outer surface 17 of the tubular part 11 are cylindrical. The respective diameters of these two surfaces 16, 17 are the same. The first tubular part 10 can be moved translationally, i.e. along the principal axis 3, on the second tubular part 11; and the first tubular part 10 can moved rotationally, i.e. around the principal axis 3, on the second tubular part 12.

A bayonet locking mechanism 18 allows for locking the first tubular body part 10 with respect to the second tubular body part 11 at discrete heights 15. The bayonet locking mechanism 18 is formed by a key pin 19 radially projecting from the inner surface 16 of the first tubular part 10 and a key passage 20 radially recessed into the outer surface 17 of the second tubular part 11. The key pin 19 is engaged within the key passage 20. The key passage 20 forms a constraining guide for the key pin 19. The first tubular body part 10 can be moved relative to the second tubular body part 11 according to the position of the key pin 19 within the key passage 20. The key passage 20 has a vertical section 21 and several horizontal sections 22. The height 15 of the cast-in pass-through firestop device 1 can be locked by the bayonet locking mechanism 18. For a locked setting of the height 15, the key pin is located in one of the horizontal sections 22. The first tubular body 10 can be rotated with respect to the second tubular body 11 but a relative translational movement along the principal axis 3 is inhibited. The height 15 of the cast-in pass-through firestop device can be modified by disengaging the bayonet locking mechanism 18. For the disengaged setting: the key pin 19 is in the vertical section 21, the first tubular body 10 can be translationally moved with respect to the second tubular body 11. The vertical section 21 intersects with the horizontal sections 22. The key pin 19 can be moved via the vertical section 21 from one horizontal section 22 to another horizontal section 22. The height 15 of the cast-in pass-through firestop device 1 is changed by a predefined step corresponding to the relative separation of the horizontal sections 22.

The vertical section 21 is orientated along the principal axis 3 and predominantly extends along the principal axis 3. The vertical section 21 can be parallel to the principal axis 3. In other embodiments, the vertical section 21 can be inclined with respect to the principal axis 3, e.g. by an angle of less than 5 degrees. The horizontal sections 22 are mainly circumferentially extending around the outer surface 17. An extension (length) around the principal axis 3 of the horizontal sections 22 is several times larger than an extension (height) along the principal axis 3 of the horizontal sections 22. The horizontal sections 22 are located in parallel planes which are perpendicular to the principal axis 3. The key passage 20 can have two or more horizontal sections 22. The vertical separations of the horizontal sections 22 define the possible height adjustments of the cast-in pass-through firestop device 1. The key passage 20 can comprise at least five, for instance at least ten horizontal sections 22. The vertical separation can be in the range of 0.5 cm to 2 cm between neighboring horizontal sections 22.

The cast-in pass-through firestop device 1 can have two or more bayonet locking mechanisms 18. The bayonet locking mechanisms 18 are arranged symmetrically around the principal axis 3; and the bayonet locking mechanisms 18 can be arranged at the same height along the principal axis. The circumferential extension of a bayonet locking mechanism 18 is equal to or slightly smaller than the fraction of 360° by the number of bayonet locking mechanisms 18. A length of the horizontal section 22 of the key passage 20 is about half of the circumferential extension of the bayonet locking mechanism 18. A length of the key pin 19 is less than half and can be more than a third of the circumferential extension of the bayonet locking mechanism 18. The height of the horizontal sections 22 is equal or is slightly larger than the height of the key pin 19. The key pin 19 can be easily moved within the horizontal sections 22. A snap closure 26 can be arranged at an end of the horizontal sections 22. The snap closure 26 can lock the key pin 19 against inadvertent rotational movement. For instance, the snap closure 26 can be formed by an arrow shaped end of the key pin 19 and a corresponding socket at an end of the horizontal section 22.

The key passage 20 of one bayonet locking mechanism 18 can be formed by a set of ribs 27 radially projecting from the outer surface 17 of the second tubular body part 11. The ribs 27 predominantly extend along the circumferentially around the principal axis 3. The ribs 27 are arranged in a column. The ribs 27 can be equidistantly displaced along the principal axis 3. i.e. arranged in distinctive planes, each perpendicular to the principal axis 3. The horizontal sections 22 of the key passage 20 are enclosed by pairs of two neighboring ribs 27. The ribs 27 can be vertically aligned. All left-handed ends of each rib 27 can be in one plane with principal axis 3. All right-handed ends of each rib 27 can be in one plane with the principal axis 3. The vertical section 21 of the key passage 20 can be formed by the left-handed ends of one column of the ribs 27 and the right-handed ends of ribs 27 of column next to the one column. A vertical rib 28 can arranged connecting the left-handed ends of the ribs 27 or can be arranged connecting the right-handed ends of the ribs 27. The vertical rib 28 can close the horizontal section 22 in one circumferential direction.

The first tubular body part 10 comprises a sealing ring 29 within the first tubular body part 10. The sealing ridge 30 can prevent concrete to flow along the vertical section 21. The sealing ring 29 has an inner circumference 31. The inner circumference 31 corresponds to the cylindrically outer surface of the second tubular body part 11. The inner circumference 31 has radially projecting sealing ridges 30. The sealing ridge 30 radially extends into the vertical section 21 of the key passage 20. The sealing ridge 30 fully or at least partly closes the vertical section 21. A circumferential extension (length) of the sealing ridge 30 can be equal to or at least half of the circumferential extension (width) of the vertical section 21 of the key passage 20. The length of the sealing ridge 30 can be equal to the length of the key pin 19.

The user rotates the first tubular body part 10 with respect to the second tubular body part 11 when disengaging and locking the bayonet mechanism 18 for adjusting the height 15 of the cast-in pass-through firestop device 1. Albeit the rotation of the first tubular body part, the sealing ring 29 keeps its angular position with respect to the second tubular body part. The sealing ring 29 is rotatably mounted on the inner surface 16 of the first tubular body part 10. The sealing ring 29 can have an outer circular perimeter matching the inner circular surface 16 of the first tubular body part 10. Guiding ribs 32 can be arranged below and above along the principal axis 3, in an adjacent manner, to the sealing ring 29. The guiding ribs 32 radially project from the inner surface 16 and inhibit an axial movement of the sealing ring 29. The key pin 19 can axially adjacent to the sealing ring 29, thus forming a guiding rib 32 for one axial direction. Instead or additionally, a circular indentation can be formed into the inner surface 16 of the first tubular body part 10. The sealing ring 29 can have a circular circumference corresponding to the circular indentation. The sealing can rotate freely around the principal axis 3 with respect to the first tubular body part 10, but cannot move translationally along the principal axis 3.

In an embodiment, the sealing ring 29 is prevented from entering the horizontal sections 22 of the key passage 20. The sealing ring 29 is arranged with respect to the key pin 19 such that the sealing ring 29 is in a plane with a rib 27 when the key pin 19 is in a plane with a horizontal section 22. The first tubular body part 10 can be rotated when the key pin 19 is in the same plane as a horizontal section 22. But the sealing ring 29 is blocked from rotating due to the rib 27. A separation of the key pin 19 and the sealing ring 29 along the principal axis 3 (vertical separation) is unequal to pairwise vertical separations between the horizontal sections 22. In an embodiment with equidistant horizontal sections 22, the vertical separation of the key pin 19 and the sealing ring 29 can be a multiple by an integer and a half of the vertical separation of neighboring horizontal sections 22. In an embodiment, an extension along the principal axis (width) of sealing ridges 30 is larger than the width of the horizontal sections 22. The ridge 30 cannot enter into the horizontal sections 22 and remains in the vertical section 21.

The inlay 9 may of an intumescent material is arranged within the tubular body 2. The inlay 9 can be arranged in the vicinity of the base plate 8 and the second opening 5. The tubular body 2 can comprise a third tubular body part 12 for the inlay 9. The third tubular body part 12 has cylindrical inner surface. An outer surface can be stiffened with elongated ribs 34 radially extending from the third tubular body part 12. The ribs 34 are oriented along the principal axis 3. The inlay 9 can have a hollow cylindrical shape. An extension (height) along the principal axis 3 of the inlay 9 can be of several centimeters. The inlay 9 can be for its full height in contact with and fully cover the inner surface of tubular body 2. In case of an incident, the inlay 9 protects the tubular body 2 from softening because of the heat. The inlay 9 rests against the solid tubular body 2, swells up towards the center, finally closing the channel 6. The inlay 9 is supported, towards the opening 5 at the base plate 8, by a metallic ring 35. The ring 35 is anchored within the tubular body 2. The ring 35 can have radially extending fingers 36: the tubular body 2, in particular the third tubular body part 12, has radial slits or openings into which the extending fingers 35 are inserted. The ring 35 can be made of two halves. The metallic ring 35 mechanically supports the inlay 9 along the principal axis 3, in particular when the inlay 9 is swelling up in a fire incident.

The inlay 9 can be separated along the principal axis from the other tubular body parts 10, 11 by a gasket 37. The gasket 37 can be arranged on top of the inlay 9. The gasket 37 can be a thin, ring-shaped membrane. For instance, the gasket can be made of a thermoplastic elastomer.

The lid 7 can be screwed to the tubular body 2. The lid 7 has threads 38 at its perimeter. The tubular body 2 has corresponding threads 39 at the first opening 4. The threads 38 are formed by molding the lid 7. The threads 38 can be radially projecting ribs 39 which are slightly inclined with respect to a plane perpendicular to the principal axis. The inclination can be in the range of 3 degrees to 10 degrees. A circumferential extension (length) of the ribs 39 is between 15 degrees to 30 degrees around the principal axis 3. The ribs 39 can be arranged in pairs. A separation between two ribs 39 of a pair is significantly smaller than a separation between two pairs. For instance, the separation within a pair is smaller than the length of a rib. e.g. in the range of 2 to 10 degrees. A separation between two pairs can be larger than the length of rib 39. The ribs 39 of one pair can form one thread of a continuous inclination, even though interrupted. The ribs 39 of one pair are arranged on the same helical curve. Ribs 39 of different pairs are arranged on different helical curve. The lid 7 can slightly deform if pushed from inside the tubular body 2. The separation between the ribs 39 within a pair allows for a tilting of the ribs 39 which releases the ribs 39 from the thread counterpart at tubular body; and the lid 7 falls of.

The base plate 8 can have several mountings points 40. The mounting points 40 can be holes for inserting a screw, nail or similar which can be used for attaching the base plate 8 to a mold or plank. The base plate 8 can have male connectors 41 and female connectors 42. The male connectors 41 of cast-in pass-through firestop device 1 can be fitted into the female connectors 42 of another cast-in pass-through firestop device 1. Thus, groups of cast-in pass-through firestop devices 1 can be arranged on a formwork 10. The male connectors 41 can be arranged at one rim of the base plate 8; the female connectors 42 can be arranged at the opposite rim of the base plate 8.

Even though the cast-in pass-through firestop device 1 is illustrated based on an exemplary use case as a through-penetration in a ceiling, the cast-in pass-through firestop device 1 is not limited thereon.

A building 43 has several spaces 44, e.g. rooms, hallways, supply channels, out-door environment. The spaces 44 are separated from each other by fixed planar structural elements 45. Examples of planar structural elements 45 can be of a vertical type, like inner and outer walls, and be of horizontal type, like floors and ceilings. The building 43 has service installations 46 that are shared by several spaces 44. The service installation can be a power grid, a data network, water supply, air conditioning and the like. Service installation elements 46, cables, tubes, and the like, are fed into the spaces 44 via through-penetrations in the separating planar structural elements 45. In principle, a through-penetration can be formed as an after-processing of a planar structure element 45 by locally demolishing, e.g. drilling or breaking an opening. The cast-in pass-through firestop device 47 provides a through-penetration along with casting the planar structure element 45.

Figure 7:
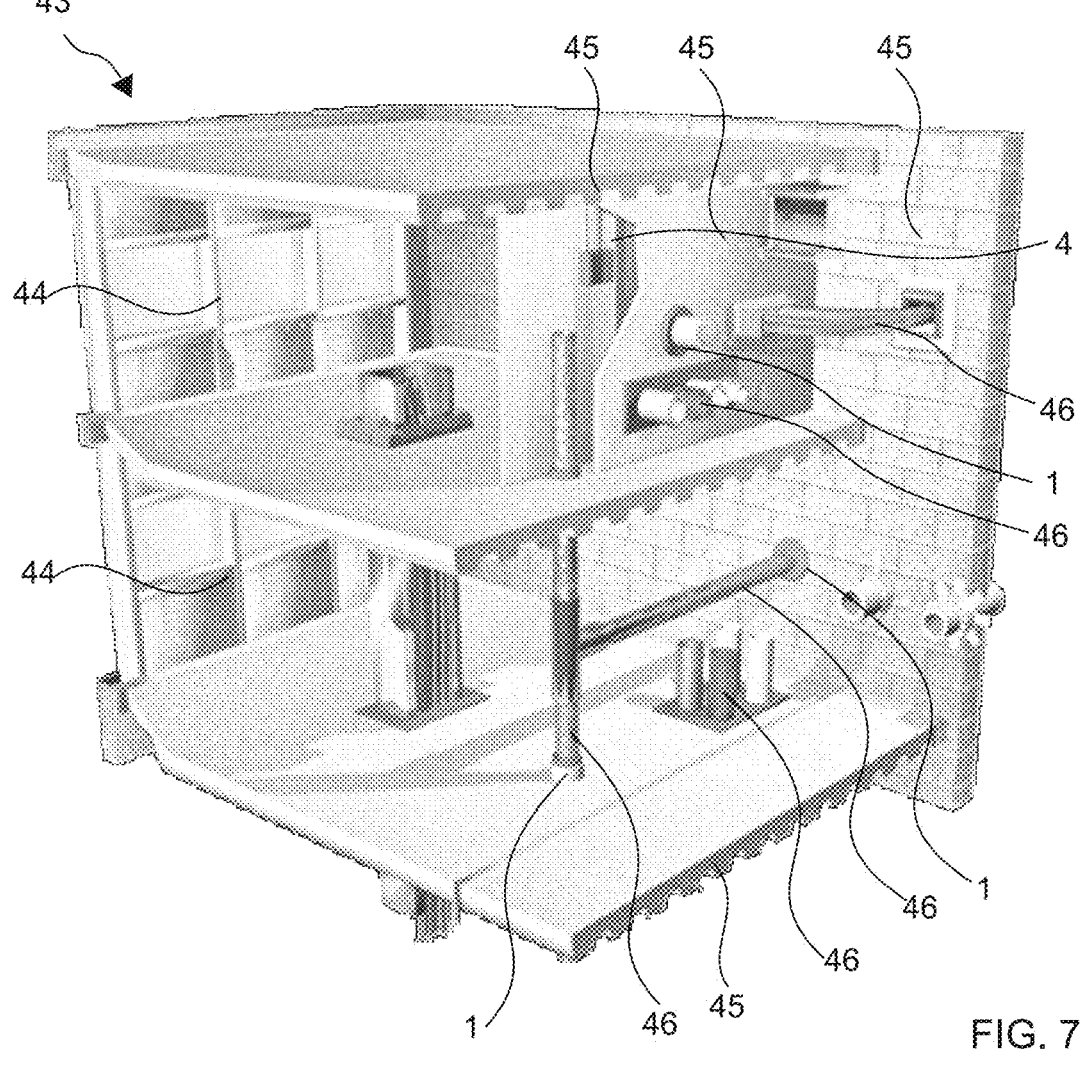
FIG. 7 illustrates a typical building and service installations
Figures 8, 9, 10, 11:
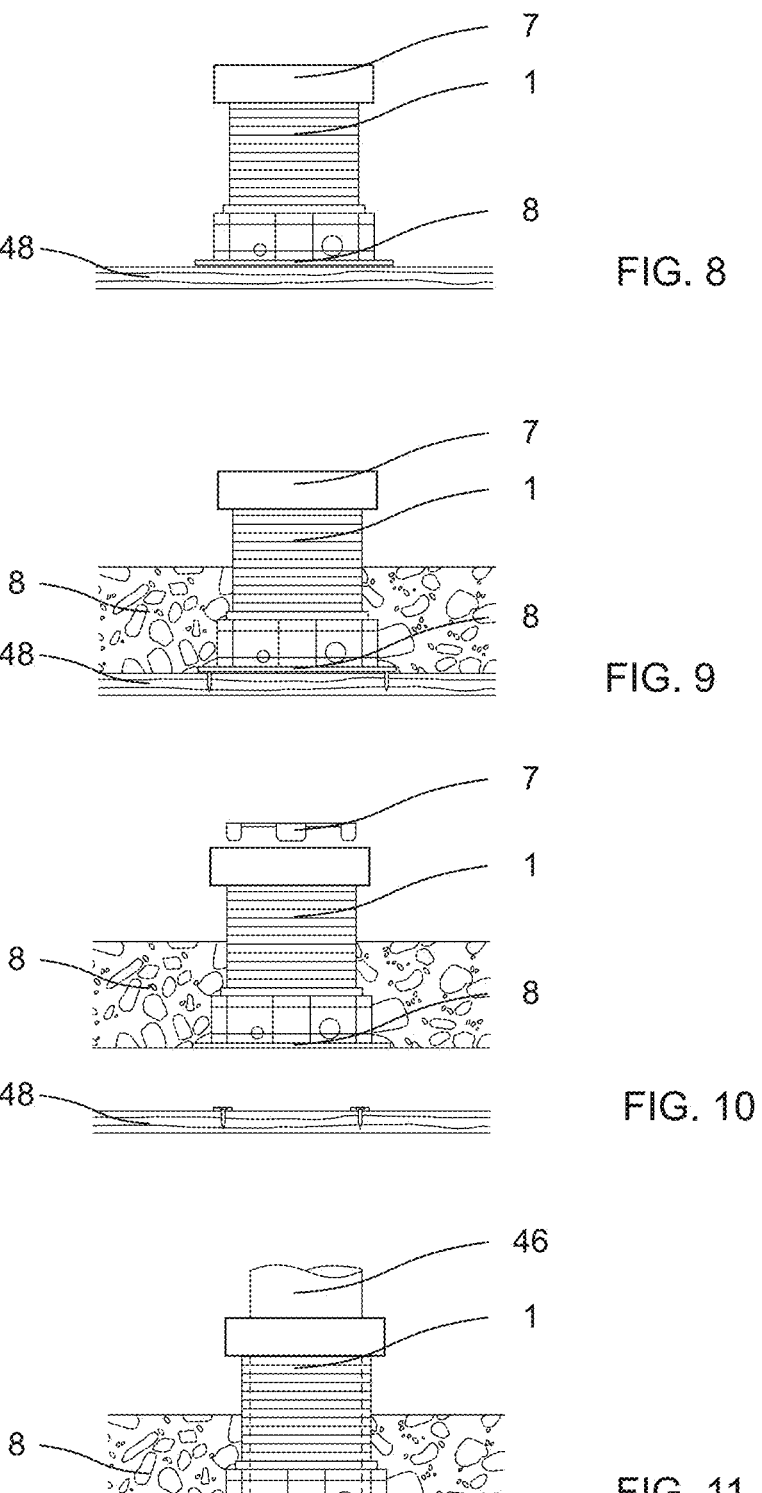
FIG. 8 illustrates an installation of a cast-in pass-through firestop device.
FIG. 9 illustrates an installation of a cast-in pass-through firestop device.
FIG. 10 illustrates an installation of a cast-in pass-through firestop device.
FIG. 11 illustrates an installation of a cast-in pass-through firestop device.

The installation method of the cast-in pass-through firestop device 47 is illustrated by the example of casting a ceiling along with FIGS. 8 to 11. A formwork 48 made of permanent or temporary molds is built FIG. 7. The cast-in pass-through firestop device 1 is arranged on the formwork 48. The cast-in pass-through firestop device 1 has positioned with its base plate 8 on the formwork 48. The user can adjust the height 15 of the cast-in pass-through firestop device 1 by rotating the top part 10 and locking the height 15 via the bayonet mechanism 18. The base plate 8 can be fixed by nails or screws to the planks or molds of the formwork. Concrete is poured onto the formwork 48 forming the ceiling FIG. 7. The lid 51 on top of the cast-in pass-through firestop device 1 prevents concrete from flowing in the channel 6 and filling the tubular body 2. Once the concrete is sufficiently cured, the formwork 48 is removed. The planar structural element 45 is formed with the cast-in pass-through firestop device embedded. By removing the formwork 48 the one opening 5 of the cast-in pass-through firestop device 1 is again accessible. The lid 7 can be removed for accessing the other opening 4. The user can feed cables, tubes 46, and the like through the cast-in pass-through firestop device 1 from one room 44 to the neighboring room 44.

What is claimed:

1. A cast-in pass-through firestop device, comprising:

a hollow tubular body, wherein the hollow tubular body comprises a first tubular body part and a second tubular body part, the first tubular body part overlapping with the second tubular body part along a principal axis;

a bayonet locking mechanism for adjusting overlap of the first tubular body part and the second tubular body part, wherein the bayonet locking mechanism comprises:

a key pin radially projecting from the first tubular body part, a key passage radially recessed in the second tubular body part, and the key pin being radially engaged with the key passage, wherein the key passage comprises at least two first sections being arranged in different planes which are perpendicular to the principal axis, and a second section arranged at least partly in parallel to the principal axis and connecting the at least two first sections, and a sealing ring, wherein the sealing ring is mounted rotatably on the first tubular body part and comprises a radially projecting sealing ridge engaged with the second section of the key passage, and an inlay made of an intumescent firestop material arranged within the hollow tubular body.

2. The cast-in pass-through firestop device according to claim 1, wherein the at least two first sections are displaced to each other along the principal axis by first distances, and the key pin is displaced to the sealing ring by a second distance, wherein the second distance is different to the first distance.

3. The cast-in pass-through firestop device according to claim 1, wherein a dimension along the principal axis of the at least two first sections is smaller than a dimension along the principal axis of the sealing ridge.

4. The cast-in pass-through firestop device according to claim 1, comprising a lid removably attached to the hollow tubular body, the lid comprising one or more threads for engaging with the hollow tubular body, and wherein each thread of the one or more threads is formed by one or more ribs that are arranged along a helical curve and separated along the helical curve by a gap.

5. The cast-in pass-through firestop device according to claim 1, comprising a base plate and a metallic ring, wherein the metallic ring is arranged between the base plate and the inlay.

6. The cast-in pass-through firestop device according to claim 5, wherein the metallic ring comprises radially extending fingers, and wherein the hollow tubular body comprises radial slits into which the fingers are engaged.

7. The cast-in pass-through firestop device according to claim 6, wherein the metallic ring is made of two halves.

* * * * *